(12) United States Patent
Akey

(10) Patent No.: US 6,704,251 B2
(45) Date of Patent: Mar. 9, 2004

(54) PSEUDO-RANDOM TRACK SELECTION IN A PORTABLE PLAYBACK DEVICE

(75) Inventor: David W. Akey, Keizer, OR (US)

(73) Assignee: Intel Corporation, Santa Clara, CA (US)

( * ) Notice: Subject to any disclaimer, the term of this patent is extended or adjusted under 35 U.S.C. 154(b) by 287 days.

(21) Appl. No.: 09/975,533

(22) Filed: Oct. 10, 2001

(65) Prior Publication Data

US 2003/0067846 A1 Apr. 10, 2003

(51) Int. Cl.⁷ .......................... G11B 19/00; G11B 21/08
(52) U.S. Cl. .................. 369/29.02; 369/30.09
(58) Field of Search .......................... 369/29.02, 30.04, 369/30.07, 30.08, 30.09, 30.27, 30.18; 704/500, 201

(56) References Cited

U.S. PATENT DOCUMENTS

| | | | | |
|---|---|---|---|---|
| 4,667,314 A | * | 5/1987 | Iwashima | 369/30.27 |
| 4,841,506 A | * | 6/1989 | Kiyoura et al. | 369/30.27 |
| 4,899,331 A | * | 2/1990 | Masaki et al. | 369/30.27 |
| 5,051,973 A | * | 9/1991 | Shiba et al. | 369/30.27 |
| 5,841,741 A | * | 11/1998 | Freeman | 369/30.27 |
| 6,355,872 B2 | * | 3/2002 | Park et al. | 369/30.27 |

FOREIGN PATENT DOCUMENTS

JP          6-162738 A  *  6/1994  ............. 369/30.27

* cited by examiner

*Primary Examiner*—Tan Dinh
(74) *Attorney, Agent, or Firm*—Marger Johnson & McCollom

(57) ABSTRACT

A method for random track playback is presented. A table base value is used to adjust entries in a pseudo-random table stored in read-only memory. A search start offset is used to select a starting point in the adjusted pseudo-random table. Entries before the starting point are effectively wrapped to the end of the pseudo-random table. A playable track, located in the adjusted, wrapped pseudo-random table, is then selected and played.

27 Claims, 10 Drawing Sheets

PSEUDO-RANDOM TRACK SELECTION IN A PORTABLE PLAYBACK DEVICE

FIELD OF THE INVENTION

This invention pertains to pseudo-random track selection, and more particularly to pseudo-random track selection in a portable device.

BACKGROUND OF THE INVENTION

The ability for a person to take a portable form of music with them has been important to most people. Early portable radios, and then the Sony Walkman, allowed people to enjoy music on the go.

With the advent of digitally stored music, the bar has been raised in terms of sound quality for listeners. Compact discs offer a level of quality that records and audiotape simply cannot reproduce. In addition, of late, tracks are being "ripped" into MP3 format. The MP3 format (formally known as the Moving Pictures Experts Group (MPEG) Audio Level 3) is a compressed format for music. An MP3 file can store a compact disc track in a fraction of the space. In addition, as the MP3 compression format achieves its compression rate by discarding information generally outside most persons' audible range, the loss of quality is generally very small.

With music stored in a randomly-accessible format, it becomes possible to offer users the opportunity to randomize track playback. (Random access can be achieved with linear-access media, such as audiocassettes, but the time delay in forwarding or rewinding the medium to the next randomly selected track is typically considered crude and unacceptable.) Compact discs can be scanned very quickly to find the next desired track, even though the tracks are arranged in a sequential fashion on the disc. And because each track stored in an MP3 format is a separate file, random access of the files enables random track playback.

In the past, to achieve random playback, a random number generator would be used to produce a random ordering for the tracks to be played. But because the random number generator was invoked when the user elected to play the tracks in a random order, the random track order had to be stored in random access memory (RAM). Because RAM is expensive to include in such playback devices, dedicating RAM to be able to create a random playback order is wasteful.

The present invention addresses this and other problems associated with the prior art.

DETAILED DESCRIPTION

Figure 1:
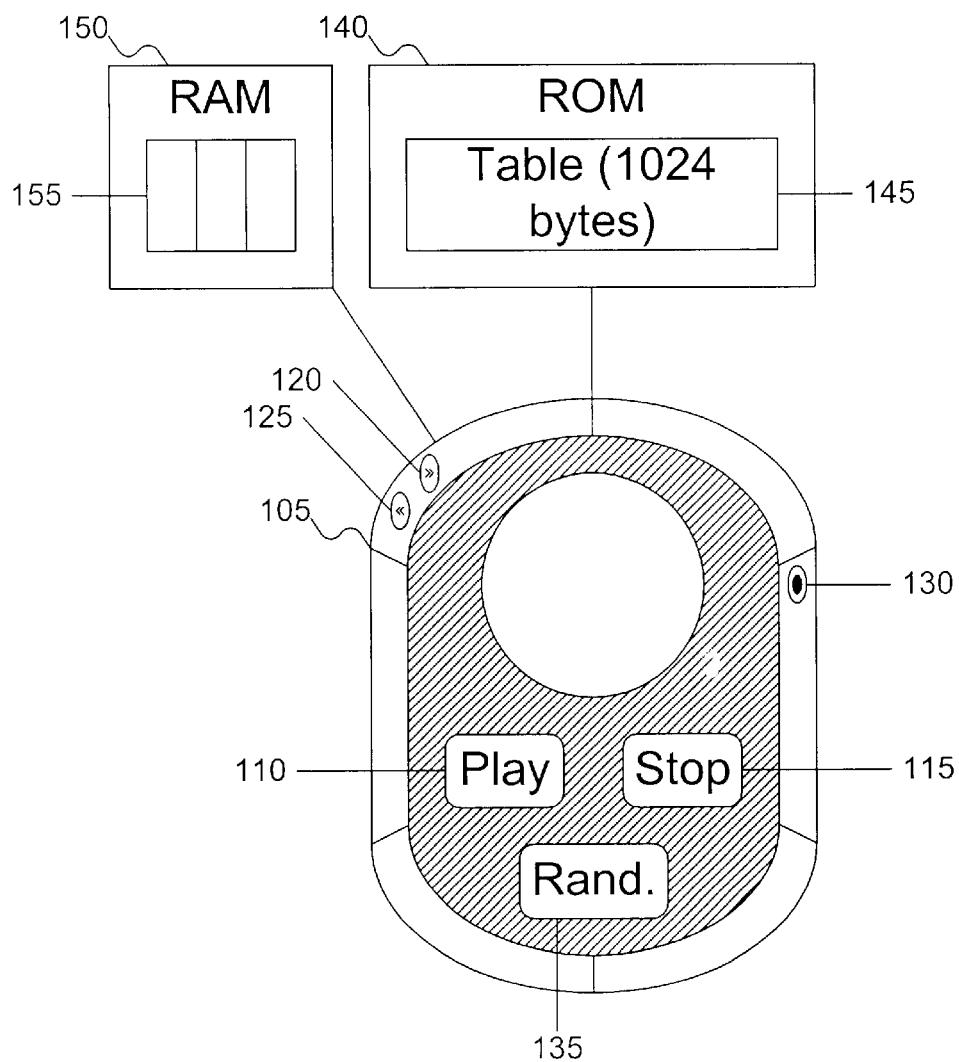
FIG. 1 shows a playback device using a pseudo-random table stored in read-only memory (ROM) to generate a random playback order, according to an embodiment of the invention.

FIG. 1 shows a playback device using a pseudo-random table stored in read-only memory (ROM) to generate a random playback order, according to an embodiment of the invention. In FIG. 1, playback device 105 is shown as a device capable of playing back Moving Pictures Experts Group (MPEG) Audio Level 3 (MP3) files. But a person skilled in the art will recognize that other devices capable of playing back stored information may be used, such as a portable compact disc player. Playback device 105 includes controls for starting and stopping playback (buttons 110 and 115, respectively), controls for moving forward and backward through the tracks (buttons 120 and 125, respectively), and port 130 for outputting the stored information.

Playback device 105 also includes random button 135. Random button 135 instructs playback device 105 to play the available tracks in a random order. That is, playback device determines a permutation of the numerical order of the available tracks, and then plays the tracks in the order specified by the permutation. For example, if there are four tracks to be played, the numerical order is 1, 2, 3, 4. One possible permutation of the track order is 2, 4, 1, 3.

One common variation on the randomization feature of playback device 105 is to play the current track first, regardless of the determined track permutation. For example, if the playback device is currently pointing to track 3, then track 3 will play back first, with the remaining available tracks played back in a random order. The embodiment of the invention described below includes this feature. However, a person skilled in the art will recognize how the embodiment may be modified to eliminate this feature, and select any random track to play back first.

To enable random playback, playback device 105 includes read-only memory (ROM) 140. ROM 140 includes pseudo-random table 145. Pseudo-random table contains the numbers from zero to one less than the size of pseudo-random table 145 in a random ordering, predetermined in advance and hard-coded into pseudo-random table 145. As pseudo-random table 145 is stored in ROM, which is non-volatile, pseudo-random table 145 contains the same values every time payback device 105 is activated.

In FIG. 1, pseudo-random table 145 is shown as including 512 integer values and occupying 1024 bytes of ROM. This value is sufficient to randomize the order of most track sets, as typically there are fewer than 512 tracks readable by playback device 105. For example, consider playback device 105 as capable of playing MP3 files. The typical MP3 file is roughly 2.5 megabytes. Five hundred twelve MP3 files would occupy almost 1.3 gigabytes of storage. Since current MP3 playback devices do not include this much storage, it is unlikely that there would be more than 512 MP3 files to play back. Nevertheless, a person skilled in the art will recognize that pseudo-random table 145 may be altered to any desired size, allowing for increases in storage capacity in playback device 145, and thereby playing back more tracks.

Playback device 105 also includes random access memory (RAM) 150. RAM 150 includes storage for three integers 155. Integers 155 are used to access pseudo-random table 145 to determine a random playback order when the user presses random button 135. Since each integer stored in RAM requires two bytes, the total RAM used by three integers 155 is six bytes.

At this point, the advantages of the embodiment of the invention should be apparent. RAM has been reduced from 1024 bytes to six bytes. Since RAM is expensive, this reduction reduces the cost of playback device 105. Further, as capacity (and therefore the number of tracks to be randomized) is increased, only ROM needs to be enlarged: RAM usage remains constant at six bytes.

Figure 2:
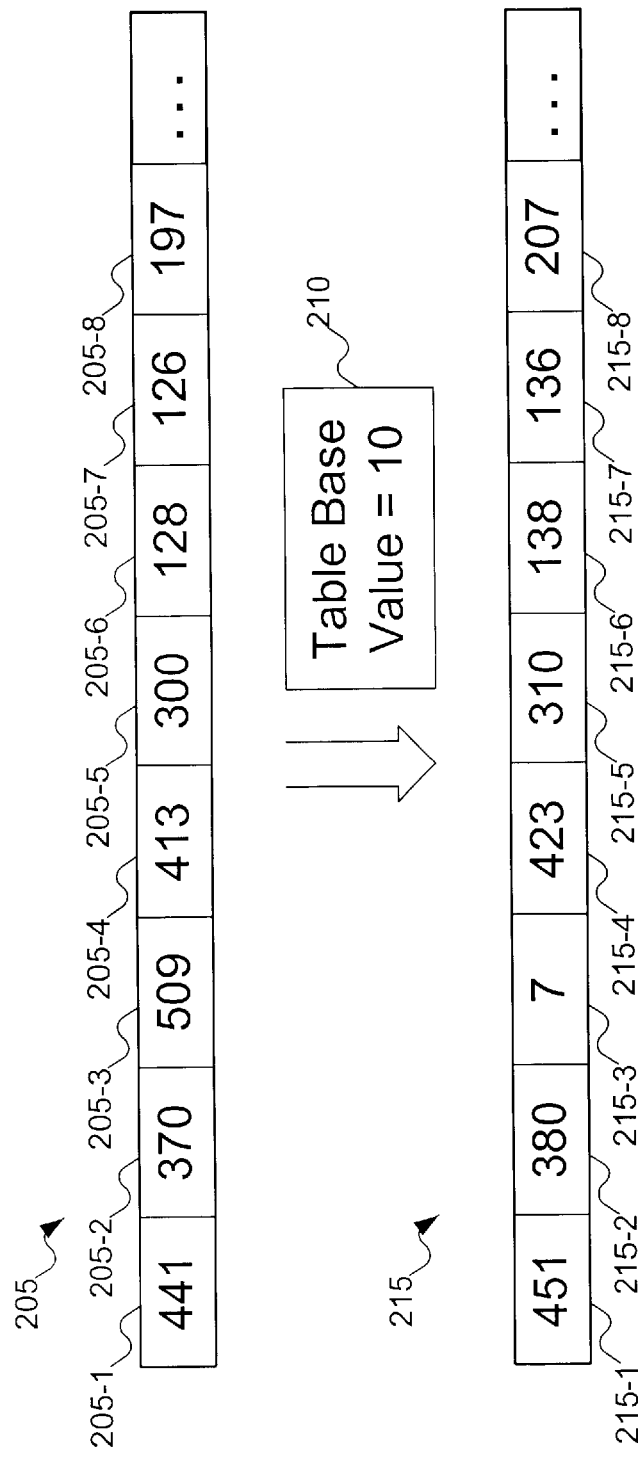
FIG. 2 shows the pseudo-random table stored in the ROM of the playback device in FIG. 1 modified using a table base value, according to an embodiment of the invention.

FIG. 2 shows the pseudo-random table stored in the ROM of the playback device in FIG. 1 modified using a table base value, according to an embodiment of the invention. In FIG. 2, some entries 205 in the pseudo-random table are shown. These entries are, beginning with the first entry, 441 (entry 205-1), 370 (entry 205-2), and so on.

The first of the three integers stored in the RAM of the playback device of FIG. 1 is table base value 210. This value is used to increment the entries in pseudo-random table 205, thereby creating a different ordering for the complete table. For example, in FIG. 2, table base value 210 is 10. The result is shown as pseudo-random table 215. Note that each entry in pseudo-random table 215 is determined by taking the corresponding entry from pseudo-random table 205 and incrementing that value by table base value 210. Thus, entry 215-1 is 451 (entry 205-1 (441)+table base value 210 (10)), entry 215-2 is 380 (entry 205-2 (370)+table base value 210 (10)), and so on.

To ensure that all values between zero and one less than the size of the pseudo-random table, the arithmetic described above is performed modulo the size of the pseudo-random table. Consider, for example, entry 205-3, with value 509. When incremented by table base value 210 (10), the adjusted value becomes 519. Since 519 is larger than the size of the pseudo-random table (which is 512), the arithmetic is performed modulo 512, resulting in the value seven (entry 215-3).

Every time the user requests a random playback of the available tracks, table base value 210 is given a new value. In one embodiment of the invention, table base value 210 is incremented (modulo the size of pseudo-random table 205) by one. A person skilled in the art will recognize that other techniques may be used to assign a value to table base value 210: for example, table base value 210 may be randomly assigned every time the user requests a random playback of the available tracks.

A person skilled in the art will recognize that, although the above description depicts the pseudo-random table as being modified, this is only simulated. Specifically, the entries in the pseudo-random table are not actually incremented, but rather when an individual entry is accessed, its value is increased by the table base value. Although operation intensive, using the pseudo-random table in this way minimizes the need for RAM. A person skilled in the will recognize how other operations described below may be accomplished using the pseudo-random table.

Figure 3:
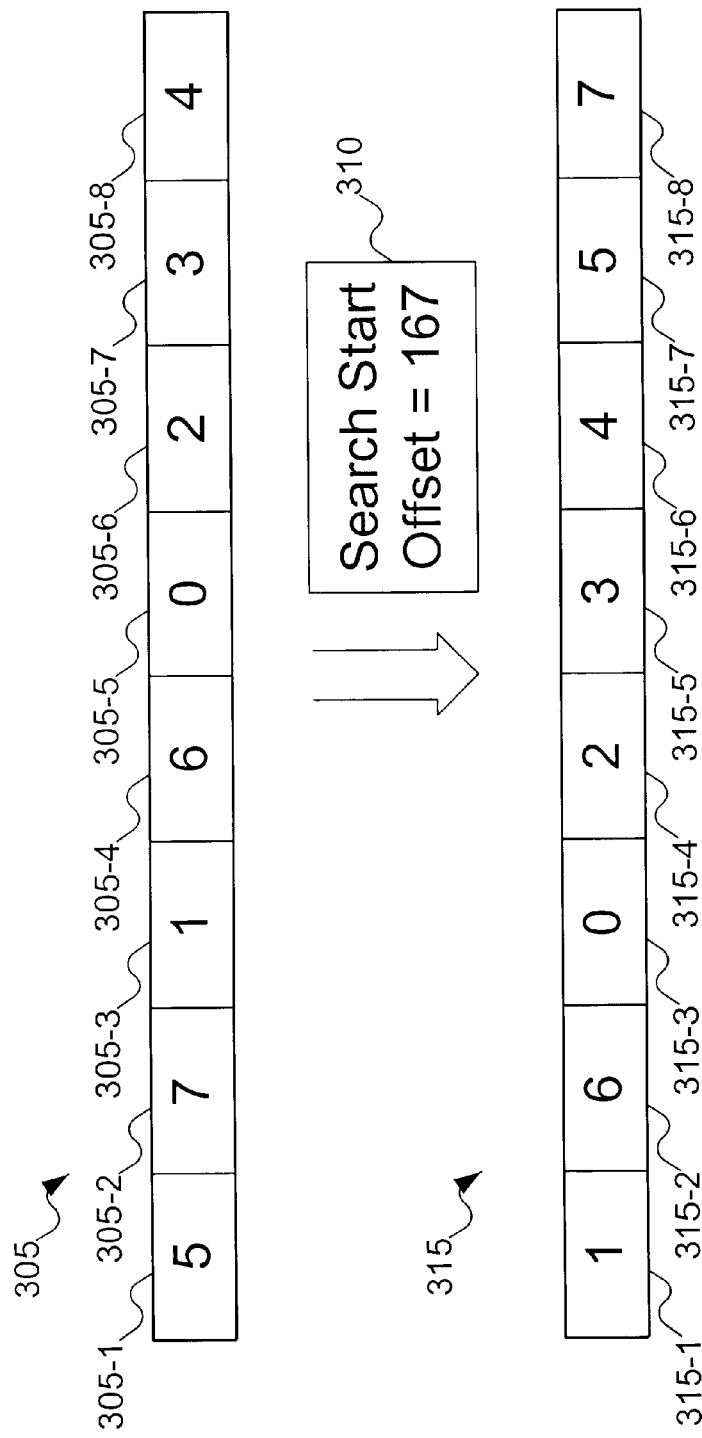
FIG. 3 shows a random playback order drawn from the pseudo-random table in the playback device of FIG. 1 modified to select a different starting point, according to an embodiment of the invention.

FIG. 3 shows a random playback order drawn from the pseudo-random table in the playback device of FIG. 1 modified to select a different starting point, according to an embodiment of the invention. Before further explaining FIG. 3, a moment of explanation about the difference between internal and external track number is useful. As far as the user is concerned, the first track is track one (1), the second track is track two (2), and so on. This is the external track numbering. But because track randomization is managed using modulo arithmetic, it is useful to number the first track as track zero (0), the second track as track one (1), and so on. If there are t tracks to be played, then the internal track numbering spans from zero to t−1. In the remainder of this document, track numbers refer to internal track numbers unless stated otherwise. Further, t refers to the number of available tracks to play.

For simplicity of representation, FIG. 3 shows a reduced table. In FIG. 3, it is assumed that there are eight tracks to randomly order (t=8). Thus, pseudo-random table 305 includes only values between zero and seven (t−1), and ignores all other values. These ignored values in pseudo-random table 305 have been eliminated from FIG. 3 for simplicity. Thus, entry 305-1 (value 5) is the first value between zero and seven (t−1) in the pseudo-random table, but is not necessarily the first entry in the pseudo-random table.

Search start offset 310 is the second integer stored in the RAM of the playback device. Search start offset 310 specifies the entry in the pseudo-random table from which the search for values between zero and t−1. For example, in FIG. 3, search start offset 310 has the value 167. Thus, the first track selected for random playback is the first entry starting with entry 167 in the pseudo-random table with a value between zero and t−1. For example, in FIG. 3, the first such entry is entry 315-1. Note that entry 315-1 might not be the $168^{th}$ entry in pseudo-random table 305, only that entry 315-1 is the first entry after the $167^{th}$ entry in pseudo-random table 305 to have a value between zero and t−1. Note also that the table wraps around, so that entry 305-1 is represented as entry 315-7 in pseudo-random table 315.

Figure 4:
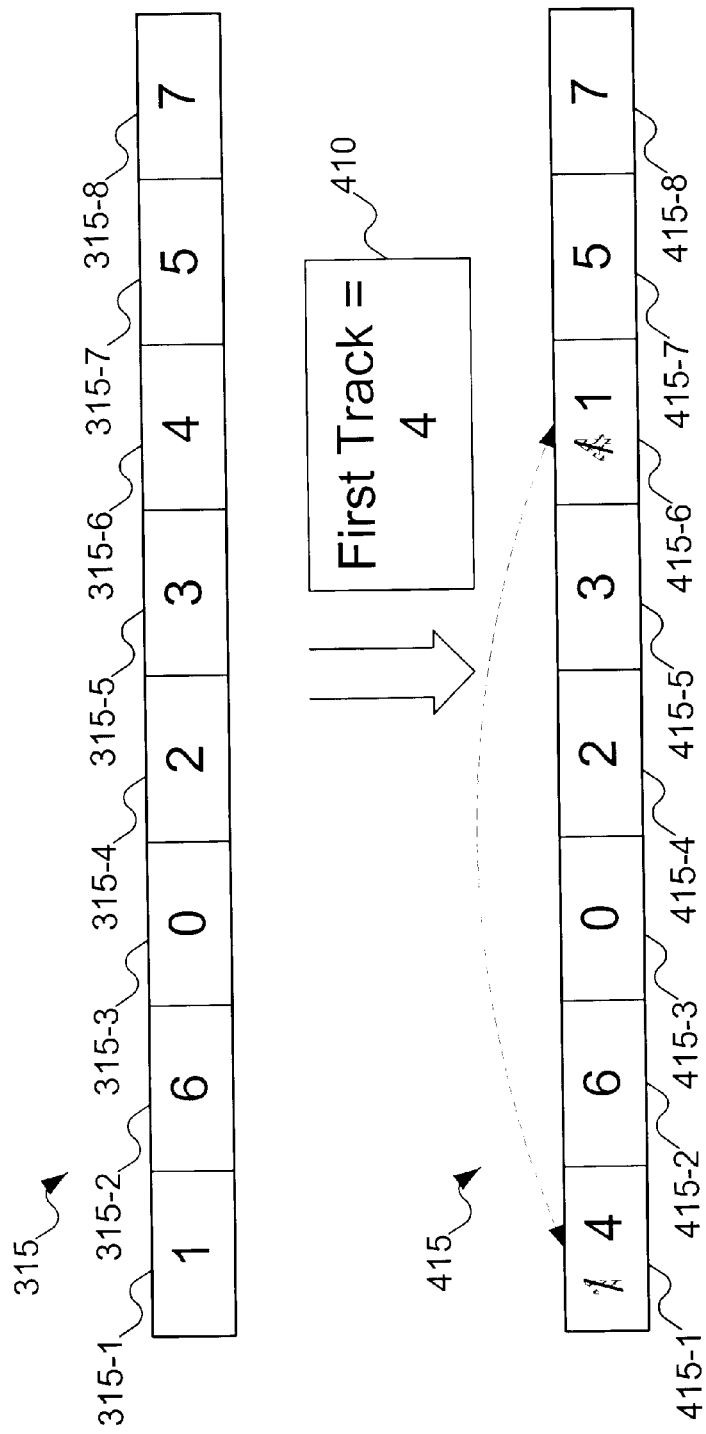
FIG. 4 shows the random playback order of FIG. 3 further modified to force a desired track to play first, according to an embodiment of the invention.

FIG. 4 shows the random playback order of FIG. 3 further modified to force a desired track to play first, according to an embodiment of the invention. As described above, one embodiment of the invention provides for a selected track to be played first. Specifically, when the user elects to randomize playback, the playback device is positioned on some available track. This track, selected by the user, is played first, before the remaining tracks are played back in a random order.

Since the playback order determined using the pseudo-random table does not force any particular track to play first, the ordering drawn from the pseudo-random table is altered to position the selected track first. Specifically, the track randomly selected to play back first is swapped with the user-selected track. To accomplish this swap, the user-selected track is stored in the RAM of the playback device as the third integer. As shown in FIG. 4, pseudo-random table 315 shows track 1 (entry 315-1) as the first random track. Since first track 410 specifies track 4 is to be the first played track, track 1 (entry 315-1) and track 4 (entry 315-6) are swapped, producing the ordering shown in pseudo-random table 415.

As discussed above, the pseudo-random table is not actually modified. To simulate the swapping of entries, the following technique is used. When the first random track is to be played, the user-selected track is automatically played. Then, when that track number appears as the next track to play within the pseudo-random table, the pseudo-random table is scanned to find the first available track after the search start offset, which track is then played.

A mathematical interlude here shows how many different orderings are possible using the pseudo-random table. Assume for the moment that there are 512 entries in the pseudo-random table, and there are 512 available tracks.

Because there are 512 different possible table base values, there are at most 512 different orderings determined by adjusting the pseudo-random table using the table base value. There are 512 possible search start offsets, resulting in 512 different possible permutations of each ordering. And since there are 512 possible selected first tracks, the first random track in each permutation could be swapped with any of the other tracks (including the degenerate case where the selected first track is also the first track of the permuted ordering). This leads to a theoretical total of $512^3 = 134,217,728$ different possible random track orderings. (Whether the theoretical total can be reached in actuality is beyond the scope of this document.) While this number is far less than the total number of possible orderings (512!, roughly $3.4 \times 10^{1166}$), it is still a large enough number that the user is unlikely to notice the "non-randomness" used in selecting a random ordering. Also, note that when there are 12 or more tracks to play back, it is not possible to achieve every possible track ordering (since $11! = 39,916,800 < 134,217,728 < 12! = 479,001,600$).

Figure 5A:
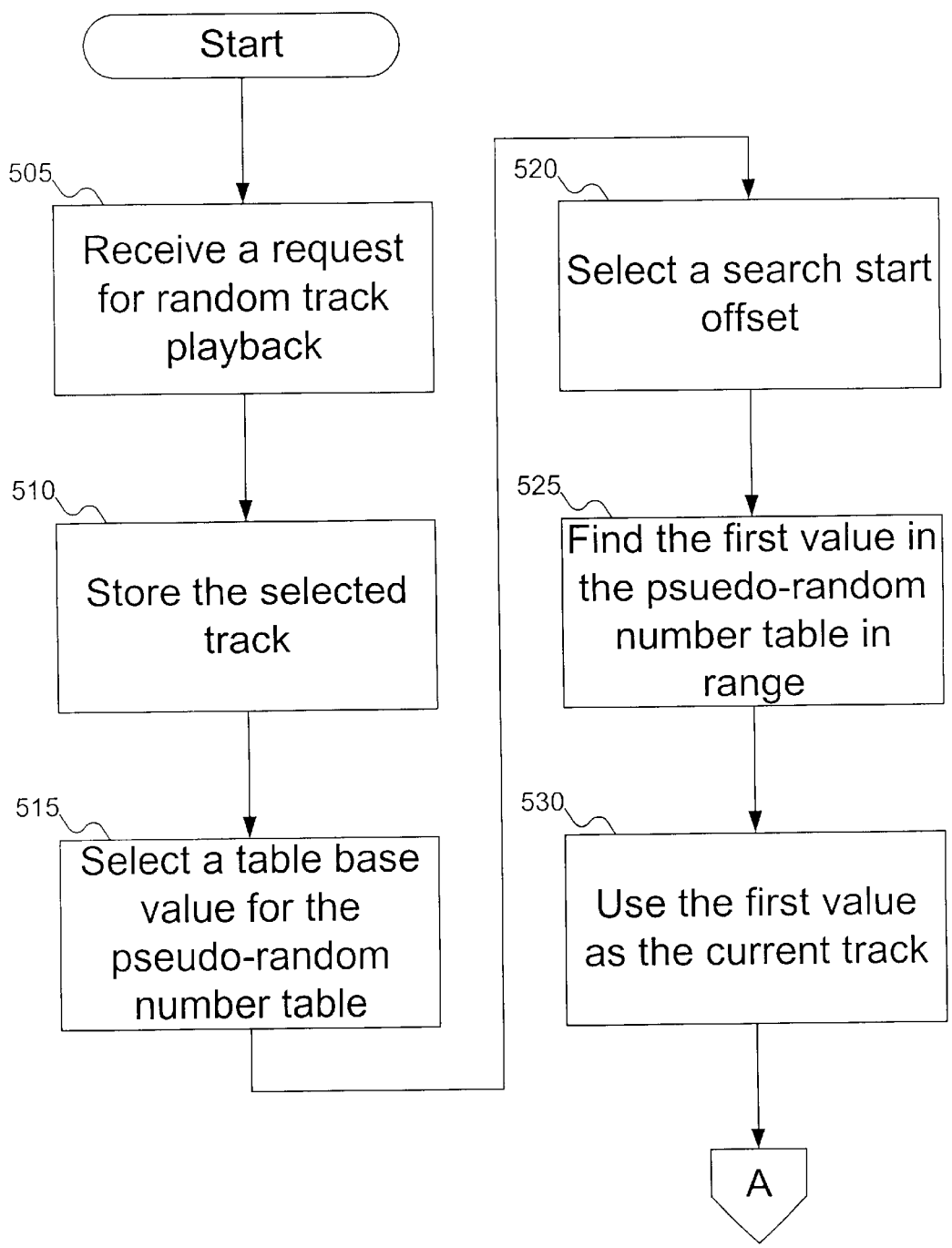
FIGS. 5A–5C show the procedure used to generate and use the random playback order in the playback device of FIG. 1, according to an embodiment of the invention.
Figure 5B:
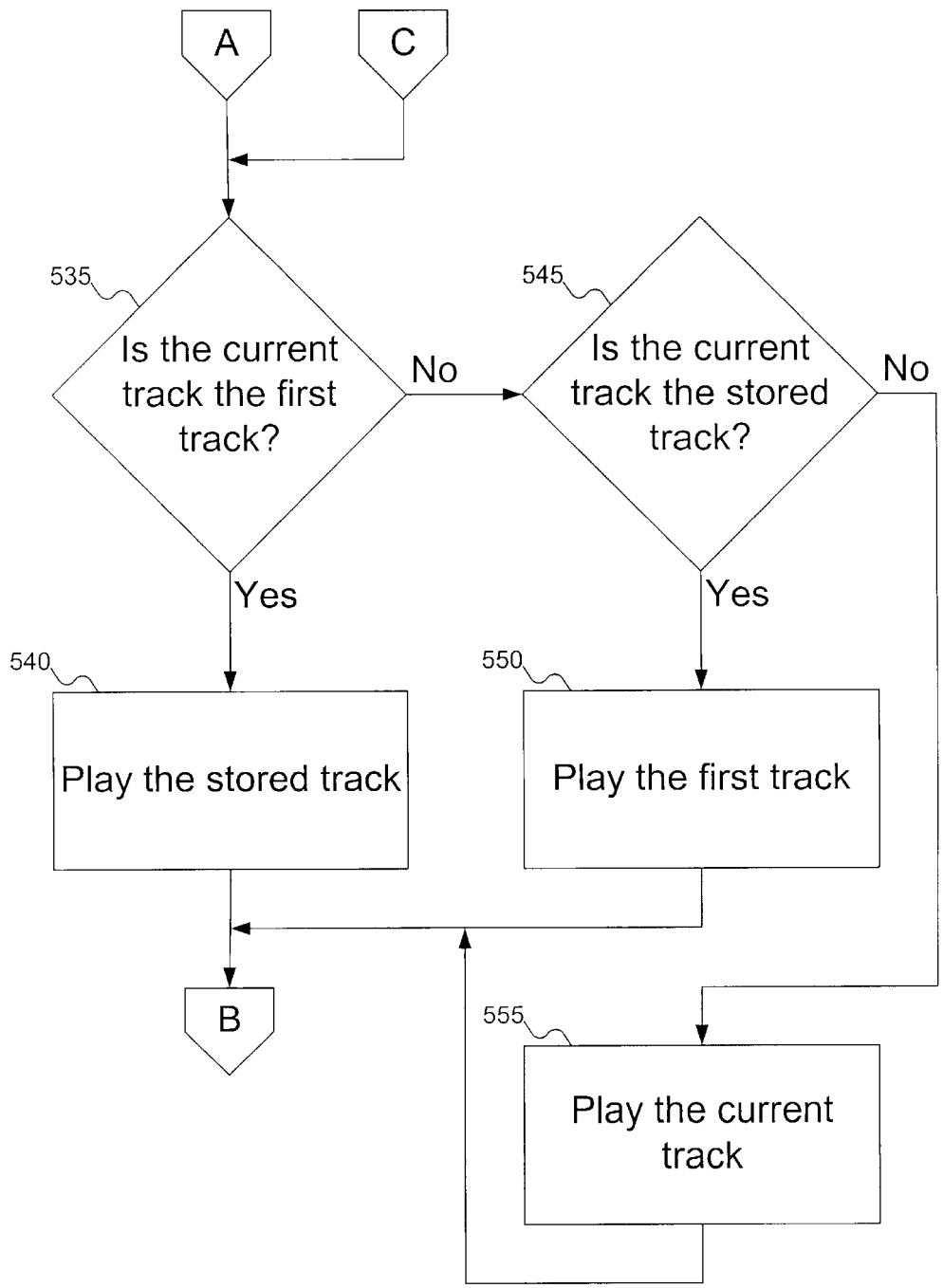
Figure 5C:
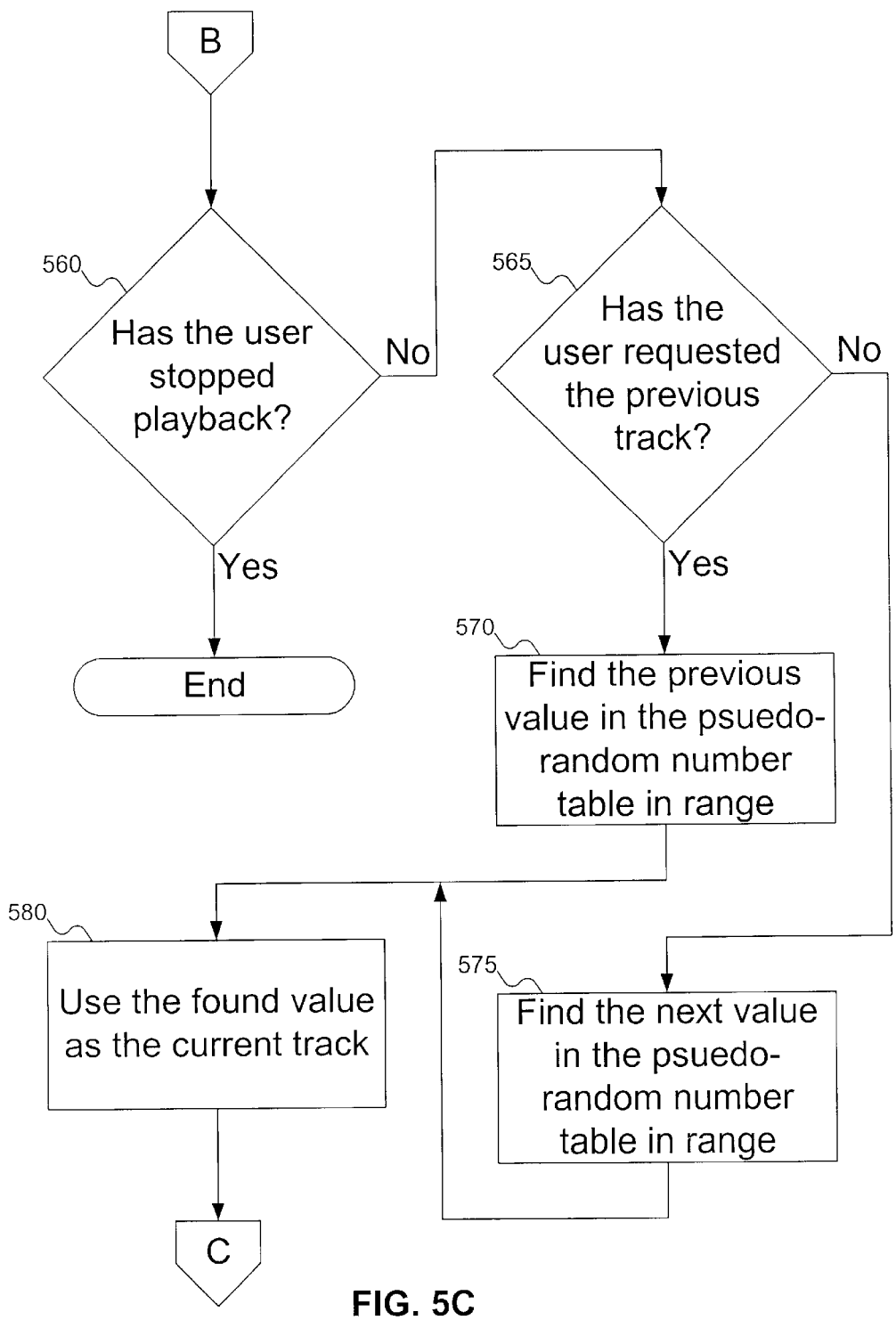

FIGS. 5A–5C show the procedure used to generate and use the random playback order in the playback device of FIG. 1, according to an embodiment of the invention. In FIG. 5A, at block 505 the playback device receives a request for random playback of the available tracks. At block 510, the track selected by the user to play as the first track is stored. At block 515, a table base value is selected. At block 520, a search start offset is selected. At block 525, the first track within range, after the search start offset, adjusting for the table base value, is located. At block 530, this track is called the current track (for purposes of the looping in the procedure).

At block 535 (FIG. 5B), the current track is checked to see if it is the first random track. If the current track is the first random track, then at block 535 the stored user-selected track is played (this is the first half of the "swap" described in the discussion accompanying FIG. 4). If the current track is not the first random track, then at block 545 the current track is compared with the stored user-selected track (see block 510 of FIG. 5A). If the current track is the stored track number, then at block 550 the first random track number is played (this is the second half of the swap described in the discussion accompanying FIG. 4). Otherwise, if the current track is neither the first random track nor the stored track, then at block 555 the current track is played.

At block 560 (FIG. 5C), the system checks to see if the user has stopped playback. Assuming the user has not stopped playback, then at block 565 the system checks to see if the user has requested the previous track be played. If the user has requested that the previous track be played, then at block 570 the previous track number is located in the pseudo-random table. Otherwise, at block 575 the next track number is located in the pseudo-random table. Finally, at block 580, the located track number is assigned to the current track number, and processing returns to block 535 in FIG. 5B.

Figure 6A:
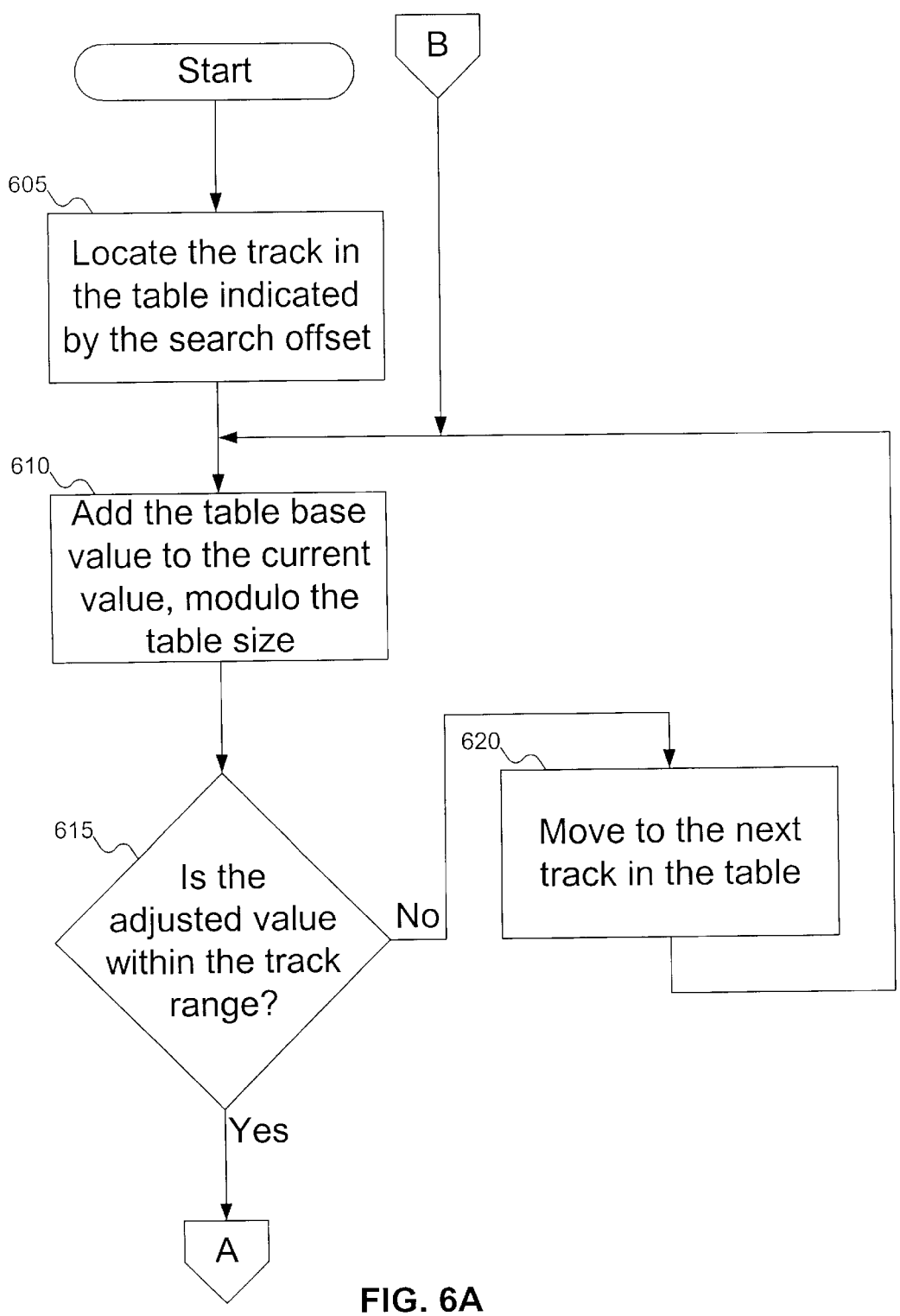
FIGS. 6A–6C show the procedure used to locate a particular random track within the pseudo-random table in the playback device of FIG. 1, according to an embodiment of the invention.
Figure 6B:
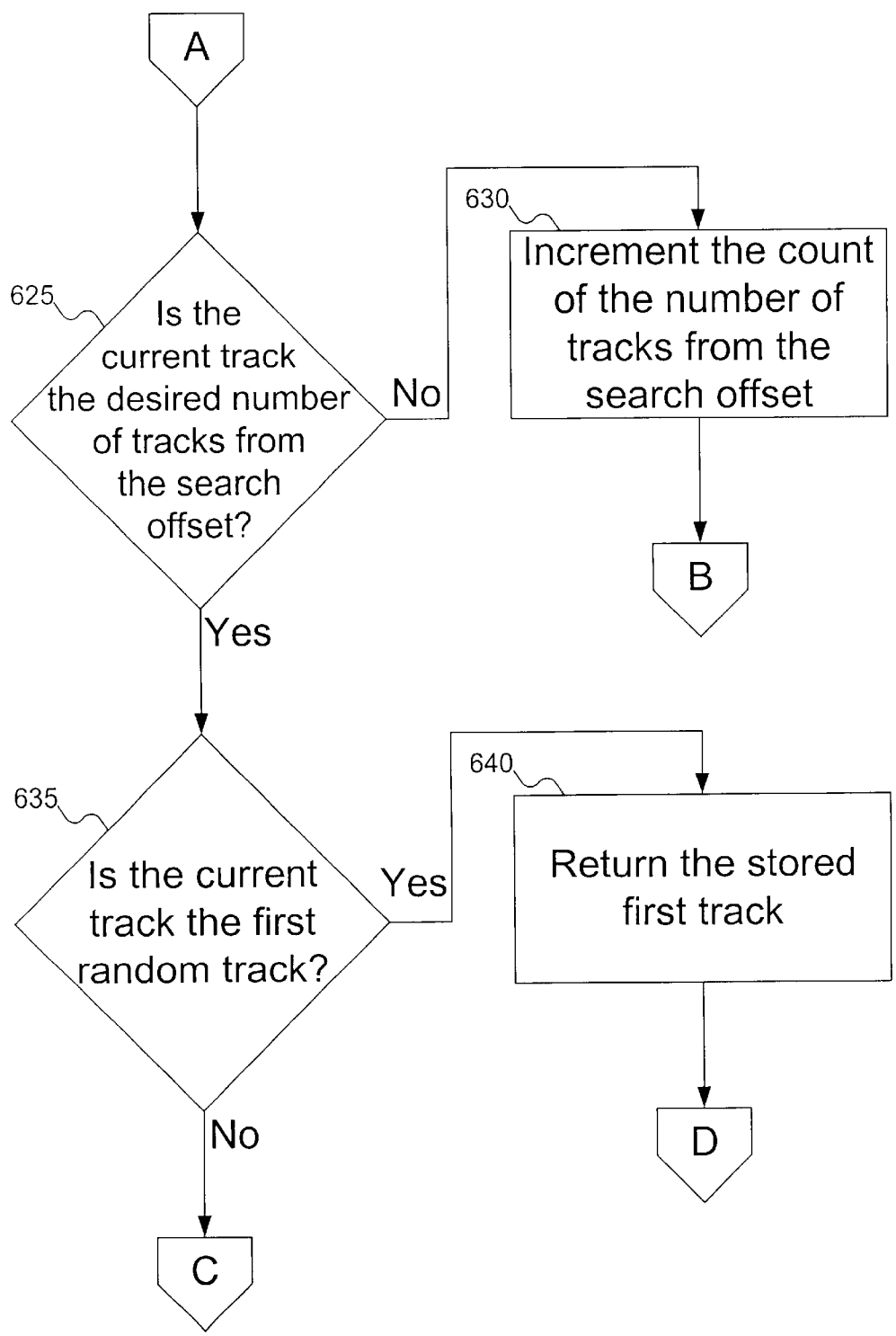
Figure 6C:
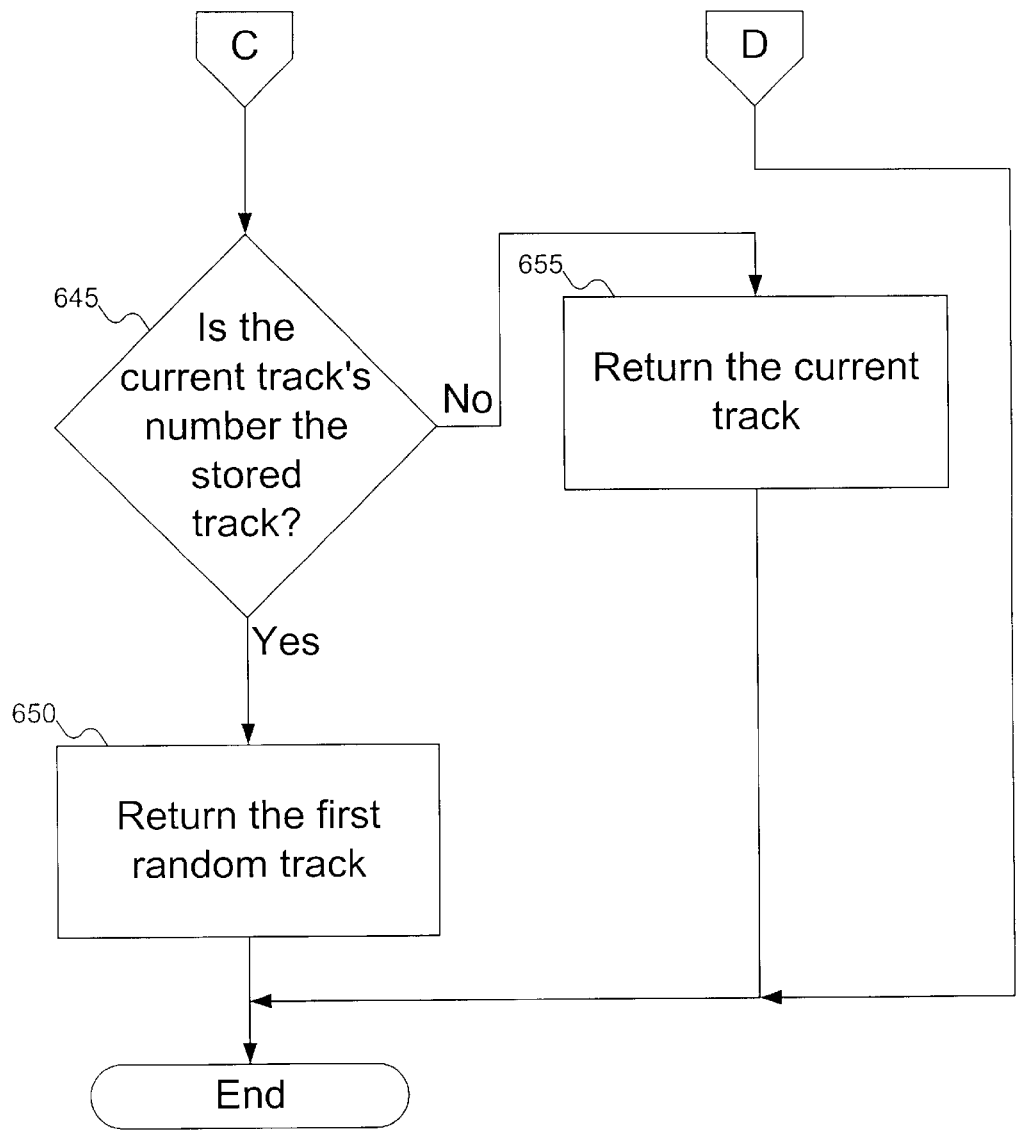

FIGS. 6A–6C show the procedure used to locate a particular random track within the pseudo-random table in the playback device of FIG. 1, according to an embodiment of the invention. For example, the procedure of FIGS. 6A–6C may be used to locate the fourth random track (assuming there are at least four tracks available for playback). A person skilled in the art will recognize that, upon review of FIGS. 6A–6C, the procedure therein outlined returns a particular track number to play. Part of FIGS. 6A–6C (specifically, blocks 635–640 of FIG. 6B and all of FIG. 6C) duplicate logic in FIGS. 5A–5C to handle playing the user-selected track first. This is because FIGS. 5A–5C describe a general procedure for playing back a sequence of random tracks, whereas FIGS. 6A–6C describe a procedure for locating a particular random track within the pseudo-random table. A person skilled in the art will recognize how to modify either FIGS. 5A–5C or FIGS. 6A–6C to eliminate the duplicate logic. For example, the procedure of FIGS. 6A–6C may be ended immediately after block 625 determines that the desired random track has been located, relegating the swap logic to the procedure of FIGS. 5A–5C.

In FIG. 6A, at block 605, the track in the pseudo-random table pointed to by the search start offset is located. At block 610, the value at the located pseudo-random table entry is increased by the table value offset. Note that arithmetic is performed modulo the table size, so that values stay between 0 and one less than the table size. At block 615, the adjusted entry is checked to see if it is between 0 and t−1. If the adjusted entry is not between 0 and t−1 (i.e., the adjusted entry is greater than or equal to t), then at block 620 the next entry in the pseudo-random table is located (wrapping around to the first entry, if the previous entry was the last entry in the pseudo-random table).

Assuming that the adjusted entry was between 0 and t−1, then at block 625 (see FIG. 6B), the current track is checked to see if it is the desired random track. If the current track is not the desired random track, then at block 630 a counter is incremented, counting the number of tracks located since the start of the search start offset. Otherwise, the desired random track has been located.

At block 635, the system checks to see if the current track is the first random track. If the current track is the first random track, then at block 640 the stored track is returned. Otherwise, at block 645 (see FIG. 6C), the current track is checked to see if it is the stored track. If the current track is the stored track, then at block 650 the first random track (located using the procedure of blocks 605–630 if FIGS. 6A–6B) is located and returned. Finally, if the current block is neither the stored track nor the first random track, then at block 655 the current track is returned.

Having illustrated and described the principles of my invention in an embodiment thereof, it should be readily apparent to those skilled in the art that the invention can be modified in arrangement and detail without departing from such principles. I claim all modifications coming within the spirit and scope of the accompanying claims.

I claim:

1. A playback device, comprising:
    a read mechanism designed to read tracks storing data in a digital format;
    a read-only memory, including a pseudo-random table;
    a random access memory, including a table base value and a first track, used to access the pseudo-random table; and
    a speaker designed to reproduce the sounds stored in the tracks.

2. A device according to claim 1, wherein the read mechanism is designed to read tracks storing data in a digital format from a compact disc.

3. A device according to claim 1, wherein the read mechanism is designed to read tracks storing data in a digital format from a digital audio file, the data stored in an MP3 format.

4. A device according to claim 1, further comprising a random number generator designed to randomly select a table base value.

5. A device according to claim 1, further comprising a random number generator designed to randomly select a search start offset.

6. A device according to claim 1, further comprising a search unit designed to search the pseudo-random table, using the table base value and the search start offset, for a playable track number.

7. A device according to claim 1, wherein the random access memory includes a search start offset.

8. A method for random track playback, the method comprising:

selecting a table base value;

adjusting a pseudo-random table based on the table base value, the pseudo-random table including at least one value;

locating a playable track number in the adjusted pseudo-random table; and playing a track with the located playable track number.

9. A method according to claim 8, further comprising swapping the located playable track number with a desired first track.

10. A method according to claim 8, wherein adjusting a pseudo-random table includes increasing each value in the pseudo-random table by the table base value.

11. A method according to claim 10, wherein adjusting a pseudo-random table further includes determining a remainder for each value in the pseudo-random table modulo a size of the pseudo-random table.

12. A method according to claim 8, wherein selecting a table base value includes randomly selecting the table base value.

13. A method according to claim 8, wherein selecting a table base value includes incrementing a previous table base value.

14. A method according to claim 8, wherein:

the method further comprises selecting a search start offset; and locating a playable track number includes locating a playable track number in the adjusted pseudo-random table after the search start offset.

15. A method according to claim 14, wherein locating a playable track number includes searching from a beginning of the adjusted pseudo-random table if there is no playable track number between the search start offset and an end of the adjusted pseudo-random table.

16. A method according to claim 14, wherein selecting a search start offset includes randomly selecting a search start offset.

17. A method according to claim 8, wherein locating a playable track number includes repeatedly locating the playable track number in the adjusted pseudo-random table.

18. An article comprising:

a storage medium, said storage medium having stored thereon instructions that, when executed by a computing device, result in:

selecting a table base value;

adjusting a pseudo-random table based on the table base value, the pseudo-random table including at least one value;

selecting a search start offset;

locating a playable track number in the adjusted pseudo-random table after the search start offset; and playing a track with the located playable track number.

19. An article according to claim 18, the storage medium having stored thereon further instructions that, when executed by the computing device, result in swapping the located playable track number with a desired first track.

20. An article according to claim 18, wherein adjusting a pseudo-random table includes increasing each value in the pseudo-random table by the table base value.

21. An article according to claim 20, wherein adjusting a pseudo-random table further includes determining a remainder for each value in the pseudo-random table modulo a size of the pseudo-random table.

22. An article according to claim 18, wherein selecting a table base value includes randomly selecting the table base value.

23. An article according to claim 18, wherein selecting a table base value includes incrementing a previous table base value.

24. An article according to claim 18, wherein:

the storage medium has stored thereon further instructions that, when executed by the computing device, result in selecting a search start offset; and locating a playable track number includes locating a playable track number in the adjusted pseudo-random table after the search start offset.

25. An article according to claim 24, wherein locating a playable track number includes searching from a beginning of the adjusted pseudo-random table if there is no playable track number between the search start offset and an end of the adjusted pseudo-random table.

26. An article according to claim 24, wherein selecting a search start offset includes randomly selecting a search start offset.

27. An article according to claim 18, wherein locating a playable track number includes repeatedly locating the playable track number in the adjusted pseudo-random table.

* * * * *